(12) United States Patent
Florin et al.

(10) Patent No.: US 7,634,123 B2
(45) Date of Patent: Dec. 15, 2009

(54) CT/MRI HEART ISOLATION USING A GRAPH CUT ALGORITHM

(75) Inventors: Charles Florin, Princeton, NJ (US); Romain Moreau-Gobard, Bangalore (IN); Yuri Boykov, London (CA); Gareth Funka-Lea, Cranbury, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 694 days.

(21) Appl. No.: 11/370,302

(22) Filed: Mar. 8, 2006

(65) Prior Publication Data

US 2006/0239553 A1  Oct. 26, 2006

Related U.S. Application Data

(60) Provisional application No. 60/665,893, filed on Mar. 28, 2005.

(51) Int. Cl.
*G06K 9/00* (2006.01)
(52) U.S. Cl. .................................. 382/128; 382/131
(58) Field of Classification Search ................. 382/128, 382/131
See application file for complete search history.

(56) References Cited

U.S. PATENT DOCUMENTS

2006/0178587 A1*  8/2006  Khoury ..................... 600/509

OTHER PUBLICATIONS

Boykov, Yuri, et al., "Fast Approximate Energy via Graph Cuts", *Proc. International Conf. on Computer Vision*, Kerkyra Greece, Sep. 1999, vol. I, (Sep. 1999), 377-384.

Boykov, Yuri, et al., "Interactive Organ using Graph Cuts", *Proceedings of MICCAI-2000, LNCS-1935*, (2000), 276-286.

Chen, Ting, et al., "3D Cardiac Anatomy Reconstruction Using High Resolution CT Data", *MICCAI 2004, LNCS 3216*,, (2004), 411-418.

Florin, Charles, et al., "Automatic Heart Peripheral Vessels Segmentation Based on a Normal MIP Ray Casting Technique", *Proceedings MICCAI 2004, LNCS 32116*, (2004), 483-490.

Frangi, Alejandro F., et al., "Automatic Construction of Multiple-Object Three-Dimensional Statistical Shape Models: Application to Cardiac Modeling", *IEEE Trans. on Medical Imaging*, vol. 21. No. 9, Sep. 2002, (Sep. 2002), 1151-1166.

Frangi, Alejandro F., et al., "Three-Dimensional Modeling for Functional Analysis of Cardiac Images: A Review", *OEEE Trans. on Medical Imaging*, vol. 20, No. 1, Jan. 2001, (Jan. 2001), 2-25.

Koikkalainen, Juha , et al., "Segmentation of Cardiac Structures Simultaneously from Short- and Long-Axis MR Images", *Proceedings of MICCAI 2004 LNCS 3216*, (2004), 427-434.

(Continued)

*Primary Examiner*—Tom Y Lu
(74) *Attorney, Agent, or Firm*—Donald B. Paschburg

(57) ABSTRACT

A method and related system for automatically and efficiently isolating the heart in Computer Tomography (CT) or Magnetic Resonance Imaging cardiac scans is disclosed. The method involves segmenting a heart within a set of volumetric data. In accordance with one aspect of the present invention, the set of volumetric data is processed to determine the minimum value of an energy function having a first term, a second term and a third term. The heart is segmented based on the processing of the set of volumetric data.

20 Claims, 6 Drawing Sheets

OTHER PUBLICATIONS

Mitchell, Steven C., et al., "3-D Active Appearance Models: Segmentation of Cardiac MR and Ultrasound Images", *IEEE Trans. on Medical Imaging*, vol. 21, No. 9 Sep. 2002, (Sep. 2002), 1167-1178.

Wierzbicki, Marcin, et al., "Mapping Template Heart Models to Patient Data Using Image Registration", *Proceedings of MICCAI 2004, LNCS 3216*, (2004), 671-678.

\* cited by examiner

CT/MRI HEART ISOLATION USING A GRAPH CUT ALGORITHM

CROSS-REFERENCE TO RELATED APPLICATIONS

This application claims the benefit of U.S. Provisional Application No. 60/665,893, filed Mar. 28, 2005, which is incorporated herein by reference.

BACKGROUND OF THE INVENTION

The present invention relates to graphical processing methods and systems. More particularly, graphical methods and related systems relating to the segmenting of an organ, such as a heart, from medical imaging information are disclosed.

Cardiac Computer Tomography (CT) is a fast, non-invasive, sub-millimeter resolution medical imaging tool. However, three-dimensional (3D) visualization requires human interaction to prepare the data, and to remove structures that do not belong to the heart (such as the lungs, liver, ribs, etc.). To assist cardiologists, techniques to segment the chambers of the heart for diagnostic purposes have been developed, but these techniques have not been used to visualize the heart surface. For these methods to be suitable across a wide array of conditions and applications, they must be fast enough for casual use, while robust enough to handle different kinds of patients and pathologies. The methods should also permit user-interaction at any point in the process, preserving the flexibility which may be required in daily use. Segmenting the heart allows it to be easily visualized within a volume of data and enables the total volume of the heart to be measured. Additionally, segmenting the entire heart allows the coronary vessels on the surface of the heart to be easily visualized.

A very large body of work exists related to the segmentation of the left ventricle of the heart in two-dimensional (2D) images, but this work is not relevant for purposes of the instant disclosure. In 3D, the published work on cardiac segmentation has been model-based. A great deal of work has gone into 3D, model-based segmentation and analysis of the left ventricle, and in some cases for both the left and right ventricles of the heart. For an overview of the art, refer, for example, to Alejandro F. Frangi, Wiro J. Niessen, and Max A. Viergever, "Three-dimensional Modeling for Functional Analysis of Cardiac Images: A Review," in *IEEE Trans. on Medical Imaging*, 20(1):2-25, January 2001. Examples of more recent work may be found, for example, in "Automatic Construction of Multiple-object Three-dimensional Statistical Shape Models: Application to Cardiac Modeling," *IEEE Trans. on Medical Imaging*, 21(9):1151-1166, September 2002, by Alejandro F. Frangi, Daniel Rueckert, Julia Schnabel, and Wiro J. Niessen; "3-D Active Appearance Models: Segmentation of Cardiac MR and Ultrasound Images," *IEEE Trans. on Medical Imaging*, 21(9):1167-1178, September 2002, by Steven C. Mitchell, Johan G. Bosch, Johan H. C. Reiber Boudewijn P.F. Lelieveldt, Rob J. van der Geest, and Milan Sonka; and "Deformable Biomechanical Models: Application to 4D Cardiac Image Analysis," *Medical Image Analysis*, 7(4):475-488, December 2003, by M. Sermesant, C. Forest, X. Pennec, H. Delingette, and N. Ayache.

This prior art isolates and defines one or two ventricles of the heart, but does not isolate the whole heart. Some more recent work attempts to segment all four chambers of the heart using a model-based approach. Examples of such work are presented by, for example, Ting Chen, Dimitri Metaxas, and Leon Axel, "3D Cardiac Anatomy Reconstruction Using High Resolution CT Data," in *MICCAI*, pages 411-418 (2004); Juha Koikkalainen, Mika Pollari, Jyrki Lotjonen, Sari Kivisto, and Kirsi Lauerma, "Segmentation of Cardiac Structures Simultaneously from Short- and Long-axis MR Images," in *MCCAI*, pages 427-434 (2004); and Marcin Wierzbicki, Maria Drangova, Gerard Guiraudon, and Terry Peters, "Mapping Template Heart Models to Patient Data Using Image Registration," in *MCCAI*, pages 671-478 (2004). The segmentation provided by these prior art methods is generally slow because of the need to simulate mechanical deformations of a graphical model in 3D. These methods are also inefficient at isolating the whole heart because the focus is on segmenting the chambers of the heart and not the surface of the heart.

It is therefore desirable to provide methods and related systems that are capable of isolating the whole heart efficiently in 3D from volumetric data.

SUMMARY OF THE INVENTION

The present invention provides methods and systems for segmenting or isolating a patient's entire heart in three dimensions from volumetric data. The heart is segmented using a graph cuts algorithm wherein an energy function is minimized.

A method in accordance with one aspect of the present invention involves processing the set of volumetric data to determine the minimum value of an energy function. Then, that information is processed to segment or isolate the heart. In accordance with a further aspect of the present invention, the energy function has a first term, a second term and a third term. The first term measures how much neighboring pixels are alike. The second term measures how strong the similarity between a value at a pixel and the likely appearance of an object. The third term is a blob function that favors contours that have a certain orientation. The third term preferably favors edges that are orthogonal in any radial direction.

In accordance with further aspects of the present invention, the first term in the energy function is defined by:

$$E_{smooth}(f) = \sum_{p,q \in neighbors} V_{p,q}(f(p), f(q)).$$

V is one of the known functions in graph cut processes that measures the likeness of neighboring pixels. The second term in the energy function is defined by:

$$E_{data}(f) = \sum_{p \in P} D_p(f(p)).$$

D is one of the known functions in graph cut processes that measures the similarity between the value at a pixel and the likely appearance of the object. The third term in the energy function, or the blob term, is defined by:

$$E_{blob}(f) = \sum_{p,q \in neighbors} B_{p,q}(f(p), f(q); C).$$

The present-invention also contemplates a computer system for segmenting a heart within volumetric data using the graph cuts algorithm wherein the energy function is minimized. It further provides a computer readable media storing program code executable by a processor to segment a heart within volumetric data using the graph cuts algorithm wherein the energy function is minimized.

DESCRIPTION OF A PREFERRED EMBODIMENT

In accordance with an aspect of the present invention, volumetric data, as obtained from medical-imaging equipment, is processed to present to a user a visually useful image corresponding to the volumetric data. The volumetric data may be obtained, for example, from whole heart magnetic resonance angiography (MRA), or CT scans. It will be appreciated that volumetric data obtained by other means may also be utilized. That is, the present invention is not limited to specific types of volumetric data, file formats, voxel or pixel resolutions, or the like. The volumetric data may be thought of as describing a plurality of specific locations in space, each with a corresponding intensity value. Of course, the volumetric data may contain additional information, but such additional information is not required for the purposes of the following disclosure.

The present invention method may be implemented in the form of a computer program executable on any suitable computing device, such as a personal computer, as known in the art. The program may be coded using any suitable programming language.

The use of graph-cut based techniques in image processing is known. See, for example, U.S. patent application Ser. No. 6,973,212, which is incorporated herein by reference, in which a graph-cut technique is discussed. However, using this technique to efficiently isolate the heart in 3D has not been disclosed, nor has the energy function discussed herein. In accordance with one aspect of the present invention, graph-cuts are used to achieve heart isolation or segmentation.

Figure 1:
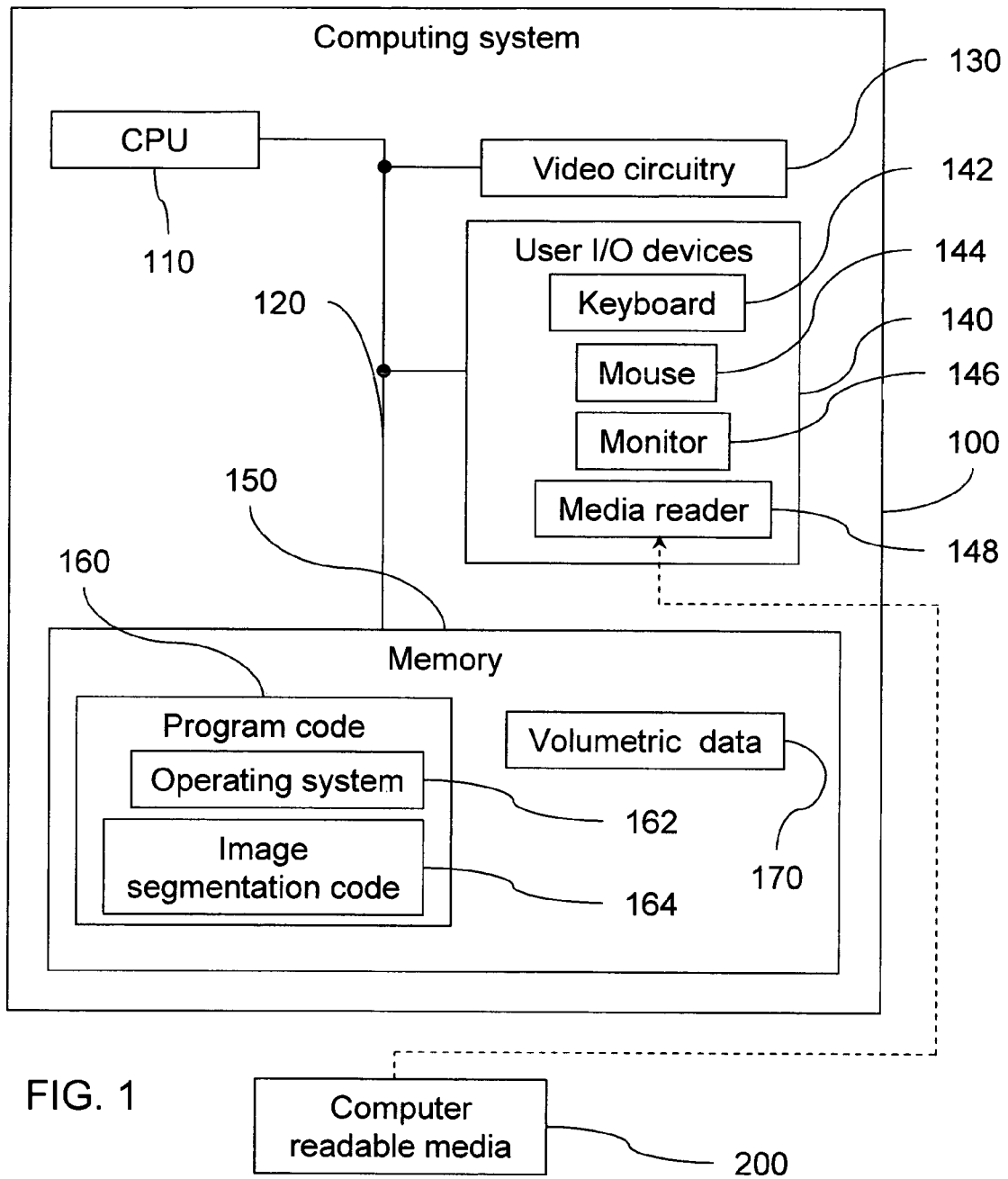
FIG. 1 shows an embodiment computer system of the present invention.

With reference to FIG. 1, the present invention method may be performed by a computing system 100. As known in the art of computational graphics, the computing system 100 typically includes a central processing unit (CPU) 110 in electrical communications via a bus 120 with video circuitry 130, user input/output (I/O) devices 140, and memory 150. The user I/O devices 140 may include a keyboard 142, a mouse 144, a monitor 146 and a media reader 148. The CPU 110 is capable of receiving user input from the keyboard 142, the mouse 144 and the media reader 148, and controls the graphical output presented by the monitor 146 by controlling the video circuitry 130. The video circuitry 130 is in communications with the monitor 146, typically via a direct electrical connection, and provides video signals suitable to drive the monitor 146. The monitor 146 may be a liquid crystal display (LCD), a cathode ray tube (CRT), a plasma display or the like. The media reader 148 is a device capable of reading information from any suitable computer-readable media, and may be a CD drive, a DVD drive, a floppy disk drive, a flash memory port, etc. The memory 150 may include working memory for the CPU 110, such as static or dynamic random access memory (SRAM, DRAM), or their equivalents, and, by way of paging, may also include storage memory, such as from a hard disk.

The memory 150 holds information that may be worked upon by the CPU 110. In particular, the memory 150 includes program code 160 that is executable by the CPU 110, and which controls the operations of the CPU 110. For purposes of the following disclosure, when it is said that the CPU 110 performs a particular task, or that a task is performed, it should be understood that it is the program code 160 that directs the CPU 110 to perform that task. The program code 160 may include an operating system 162, such as the Windows® operating system, and also includes image segmentation code 164, which implements the present invention method.

The image segmentation code 164 may be installed into the memory 150 of the computer system 100 from a computer-readable media 200, such as a CD, DVD, floppy disk, flash memory card, etc. This computer-readable media 200 holds the image segmentation code 164, optionally in a compressed, segmented or otherwise encoded form. When inserted into the media reader 148, an installation process, such as by an installation procedure provided by the operating system 162, as known in the art, installs or loads the image segmentation code 164 into the memory 150. The image segmentation code 164 may then subsequently be executed by the CPU 110 to perform the instant method.

The system 100 can be a workstation, a personal computer, a multi-processor system or any other computing system. The code can be provided in any number of languages.

There are three important aspects of the instant method for automatic heart isolation. The first is the use of a graph-cut technique to do most of the segmentation work. This graph-cut technique has been disclosed by Yuri Boykov & Marie-Pierre Jolly in U.S. Pat. No. 6,973,212, filed Aug. 30, 2001 and entitled, "Graph Cuts for Binary Segmentation of N-dimensional Images from Object and Background Seeds," which is incorporated herein by reference. However, this graph-cut technique needs a starting point or seed region that is known to be inside the heart before it can start. How a seed region is automatically found so that the segmentation can be run automatically is the second aspect of the invention method, and is explained below. The third aspect is that the graph-cut segmentation is provided a new constraint beyond what has already been described in the literature. An additional constraint is added to provide a preference for shapes whose edges are oriented perpendicular to the direction towards the center of the seed region. This may be termed the "blob" constraint. This blob constraint helps to prevent leakage during the segmentation process into the aorta or pulmonary vessels.

Figure 2:
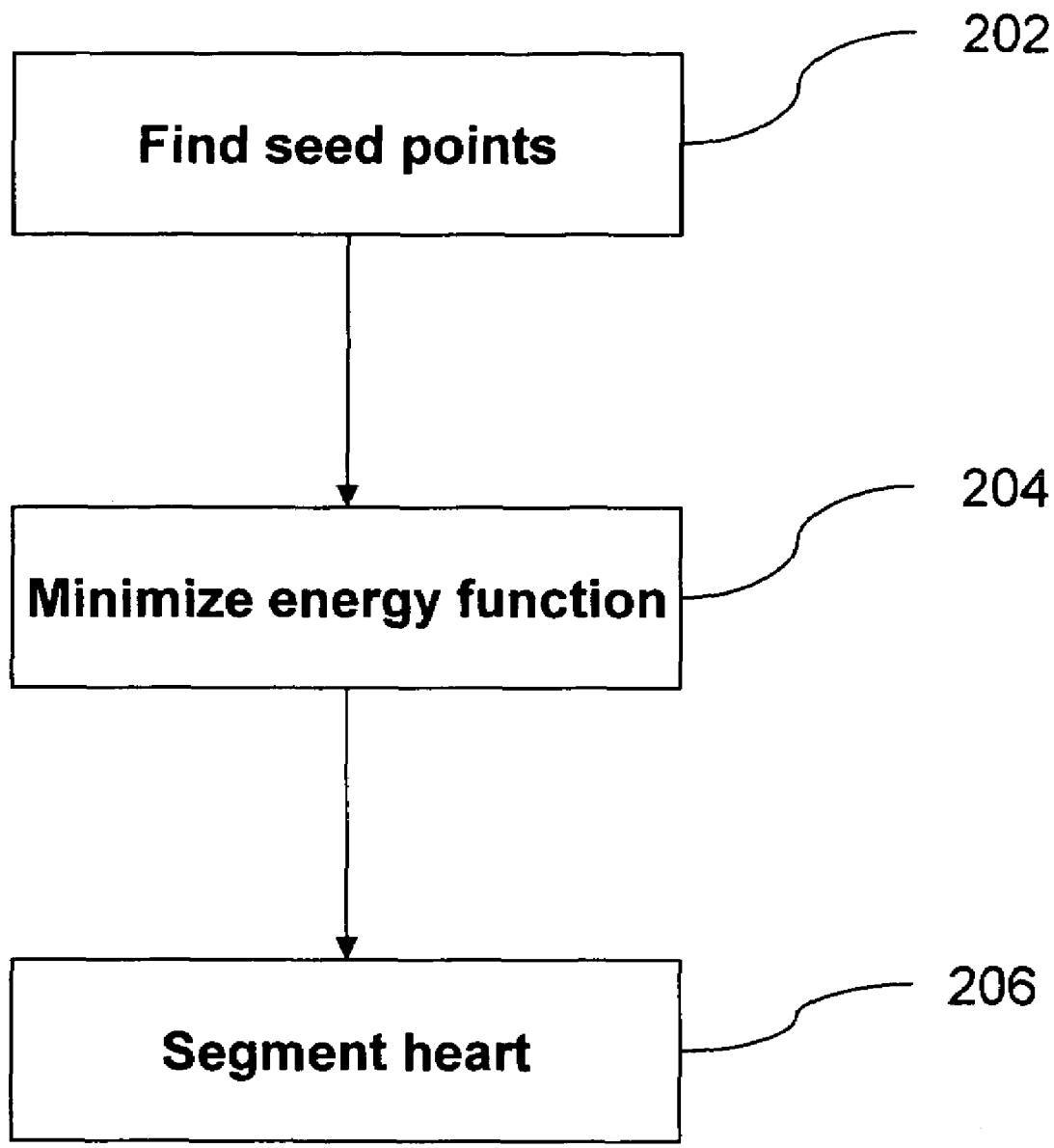
FIG. 2 illustrates a method in accordance with one aspect of the present invention.

The method is summarized in FIG. 2. In the first step 202, seed points are selected, either automatically or manually. In step 204, an energy function is minimized. In the next step 206, an object in an image, such as a heart, is segmented from three dimensional volumetric data 170.

Graph-cut based segmentation methods generally require initialization with seed points. These seed points can be placed manually, or may be placed automatically by detecting the location of the heart.

It is preferred to use an automated approach to find seed points. In accordance with one aspect of the present invention, therefore, the volume barycenter weighted by intensity is calculated. When working with contrast CT studies, the brightest regions are bone and blood and the location of this point is most affected by the distribution of these tissues. The distribution of bone in the chest is relatively symmetric about the heart. The largest concentrations of blood are generally within the chambers of the heart. As a result, in nearly all cases tested the point found was within the heart.

The graph-cut segmentation finds the optimal separation between points known to lie within the heart and points outside the heart. The measure of the goodness of a segmentation is determined by the contrast at the separation surface. Within the heart in contrast CT there are a number of high-contrast boundaries associated with each of the chambers and the major blood vessels attached to the heart. Consequently, it is important to find as many points within the heart as possible, but non outside the heart when initializing the graph-cut segmentation. Assuming a point located in the heart is given, the pre-segmentation step consists of determining the sphere of maximum volume contained within the heart.

Figure 3:
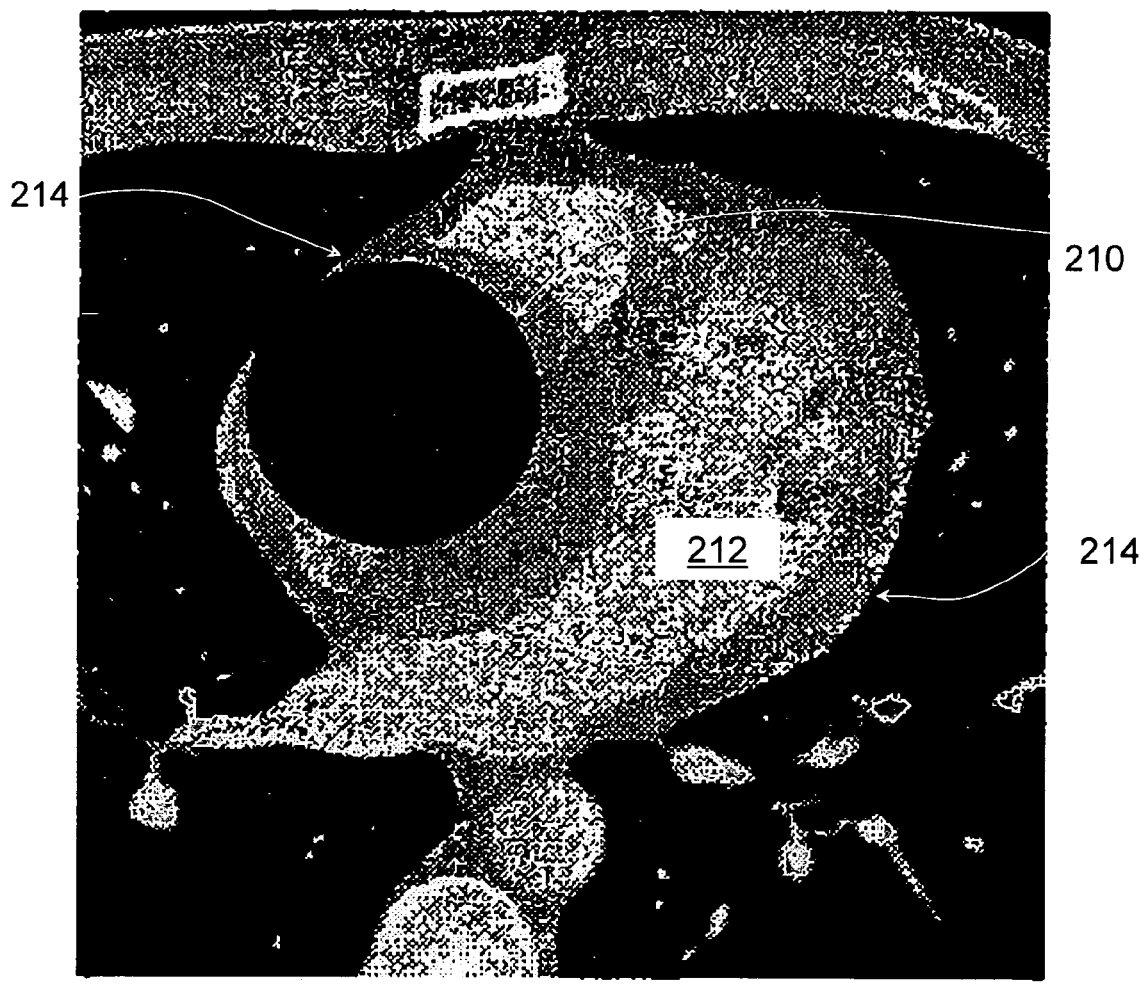
FIG. 3 illustrates a virtual balloon being blown inside a heart encoded within volumetric data according to one aspect of the invention method.

To this end, with reference to FIG. 3, a virtual balloon 210 is blown inside the heart 212, starting from the estimated heart 210 center point that was obtained above, until the heart wall 214 is reached. As the balloon grows, it will eventually touch a wall of the heart. When it does, it keeps on growing in the direction opposite to the contact point, just as if a balloon that touches a wall would as it is being blown up. This initialization step stops when the balloon touches several walls and cannot be inflated any more. A limited number of reasonable assumptions are preferably made on the detection of contact points. Heart images are consistent with Hounsfield units. Thus, the heart wall (the limit between the blood pool and lungs) always has the same intensity gradient. The blood pool and myocardium are characterized, for the most part, by intensities larger than −224 Hounsfield units and any intensity below is considered as part of the out of heart structures. This technique has several advantages. It simplicity keeps the needed computation time low and the balloon's form (ellipsoidal) is close to the actual heart's surface shape. If the result of the balloon expansion is a region that is too small to be a region within the heart, then the process terminates and no heart isolation is produced.

This balloon 210 is used as the seed point for the graph cut segmentation method presented below. This balloon technique has several advantages: its simplicity keeps the required computation time low, and the spherical shape of the balloon 210 is close to the surface shape of the heart 212, thereby providing a good prior for the segmentation. On a 2.4 GHz processor 1 GB of RAM, the balloon step typically takes less than a second, and is independent of the patient.

In an embodiment, the segmentation method utilizes the graph optimization technique as disclosed in the above-indicated incorporated reference, but with a shape constraint. Generally, the idea behind graph-cut segmentation is to minimize an energy function that is defined for a labeling of the nodes in a graph into two classes: object and background, according to the cut of minimum weight. The function $f$ is the labeling in accordance with standard graph cuts processing techniques. The energy is written as the sum of two terms: $E_{smooth}(f)$ that imposes smoothness constraints on the segmentation map, and $E_{data}(f)$ measuring how the label $f$ is adapted to the data:

$$E(f) = E_{smooth}(f) + E_{data}(f),$$ Eqn. 1

$$E_{smooth}(f) = \sum_{p,q \in neighbors} V_{p,q}(f(p), f(q)),$$ Eqn. 2

$$E_{data}(f) = \sum_{p \in P} D_p(f(p)).$$ Eqn. 3

$V_{p,q}$ in Eqn. 2 is the interaction function between a pair of neighboring pixels {p, q}, and is a measurement of how much the neighboring pixels look alike. $D_p$ in Eqn. 3 measures how close the label $f$ is to the pixel p intensity or a measurement of how similar the value of a pixel matches the appearance of the object. These functions can take a number of known forms. It is known, as disclosed by Yuri Boykov, Olga Veksler, and Ramin Zabih in "Fast Approximate Energy Minimization Via Graph Cuts", *ICCV*, pages 377-384 (1999), that such a method provides a global optimal solution for the case of a binary valued $f(p)$.

In one embodiment of the present invention, Eqn. 1 is modified to include a third term, a "blob" constraint:

$$E(f) = E_{smooth}(f) + E_{data}(f) + E_{blob}(f),$$ Eqn. 4

$$E_{blob}(f) = \sum_{p,q \in neighbors} B_{p,q}(f(p), f(q); C),$$ Eqn. 5

Figure 4:
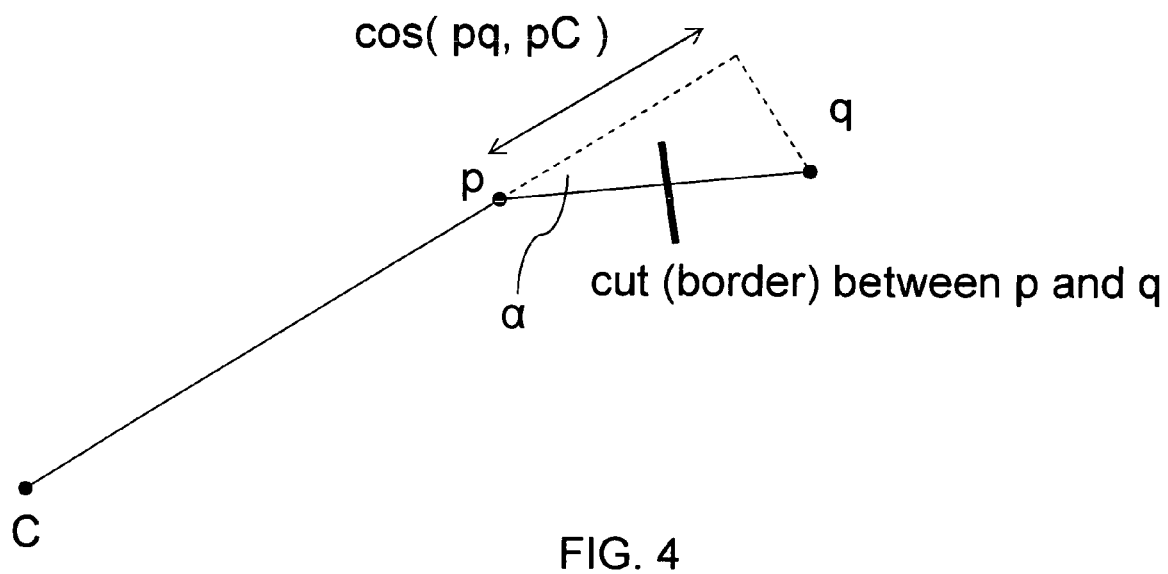
FIG. 4 illustrates the operation of a blob constraint in accordance with one embodiment of the present invention.

$B_{p,q}$ in Eqn. 5 is a cost associated with the angle between the line segments pq and pC where C is the center of the seed region. Thus, a blob energy term encourages cuts to look like convex blobs that are roughly centered at C. The present invention attempts to minimize this cost along the segmentation contour. This is illustrated in FIG. 4. FIG. 4 shows that the term cos(pq,pC) is determined from the angle α between the extended radial line pC from the center and the line between pixel p and pixel q.

In particular, one embodiment of the present invention uses $B_{p,q}(f(p),f(q),C)=\cos^2(pq,pC)*\delta(f(p),f(q))$ if $\cos(pq,pC)<0$ and $B_{p,q}(f(p),f(q))=0$ otherwise. The function $\delta(f(p),f(q))$ can be described by:

$$\delta(f(p), f(q)) = \begin{cases} 1 & \text{if } f(p) \neq f(q) \\ 0 & \text{if } f(p) = f(q) \end{cases}$$

Figure 5:
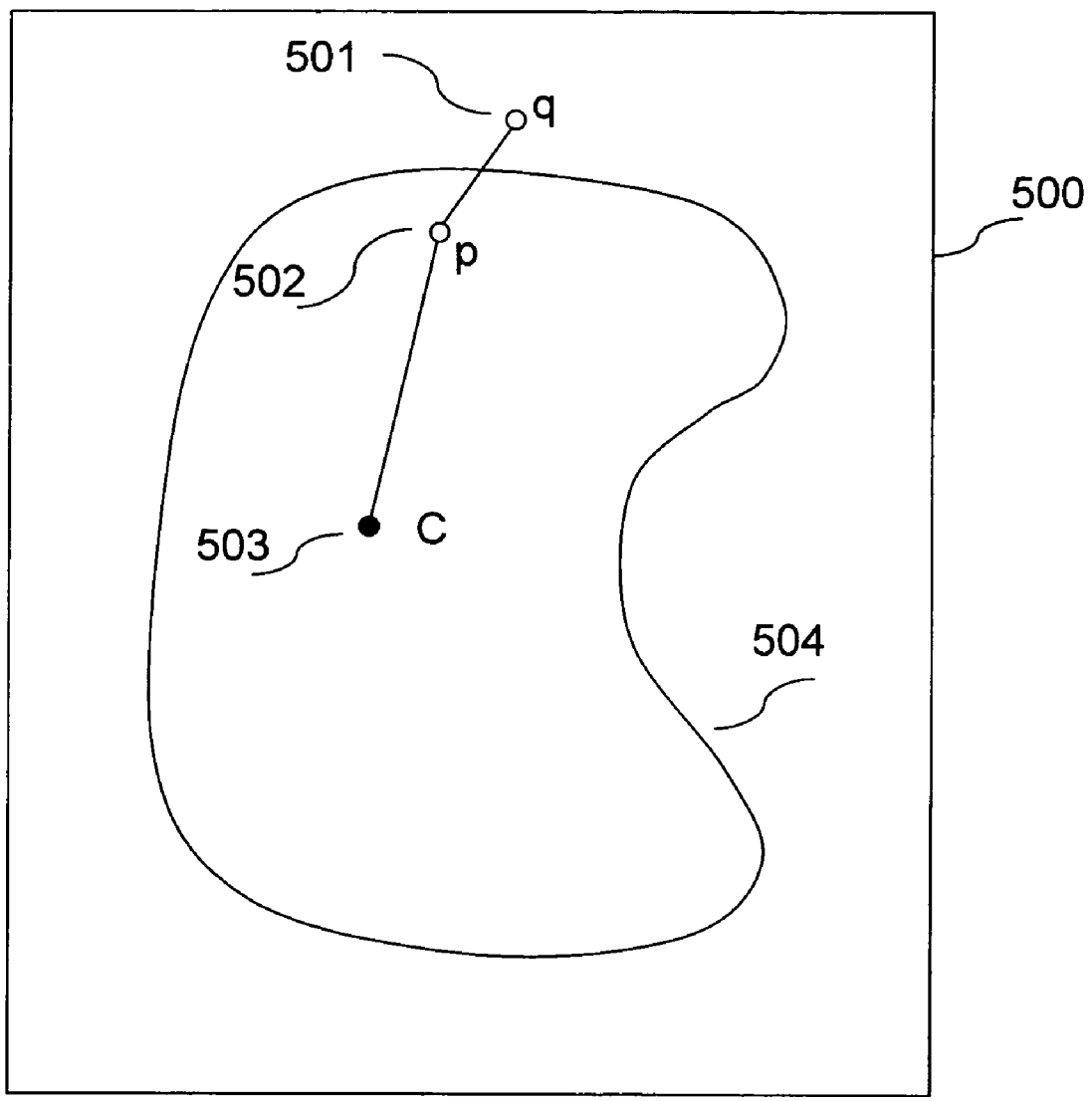
FIG. 5 illustrates the contribution of two pixels to the blob energy term.

Note that $B_{p,q}$ can be thought of as a penalty for a cut to fold with respect to the rays pC from the given center C to each pixel p as is shown in FIG. 4. Thus, a blob energy term, in accordance with the present invention, favors edges that are orthogonal to a radial direction and encourages cuts to look like convex blobs that are roughly centered at C. The application of the blob energy term to the graph cuts method is shown in an illustrative diagram in FIG. 5. An image 500 is comprised of a plurality of pixels. The given center C of the object is 503. The contribution to the blob energy term in this diagram by the pixels 501 and 502 is determined by $B_{p,q}$. For illustrative purposes a possible graph cuts contour 504 is shown.

Thus, in accordance with one aspect of the present invention, the energy function is solved for all pixels so as to minimize the energy function. The actual segmentation of the object in the graph-cuts process once an energy function has been minimized is known to those skilled in the art. In accordance with one explanation, the connections between pixels are viewed as pipes that carry a fluid, and the boundary is defined by those pipes that saturate and will carry no more fluid.

The segmentation output distinguishes the heart from the rest of the image. On a 2.4 GHz processor with 1 GB of RAM, the segmentation step requires about 20 seconds.

Statistics can be used to obtain a better initialization of the seed points. The segmentation can also be run over a large set of patients, features extracted and a model developed for seed initialization. Another solution puts aside the present binary segmentation and a continuous segmentation (each pixel receiving a probability of belonging to the heart), coupled to an opacity related to the segmentation probability. Thus, pixel's opacity would be proportional to the probability that they belong to the heart.

Figure 6:
FIG. 6 shows the image of a heart from a patient.
Figure 7:
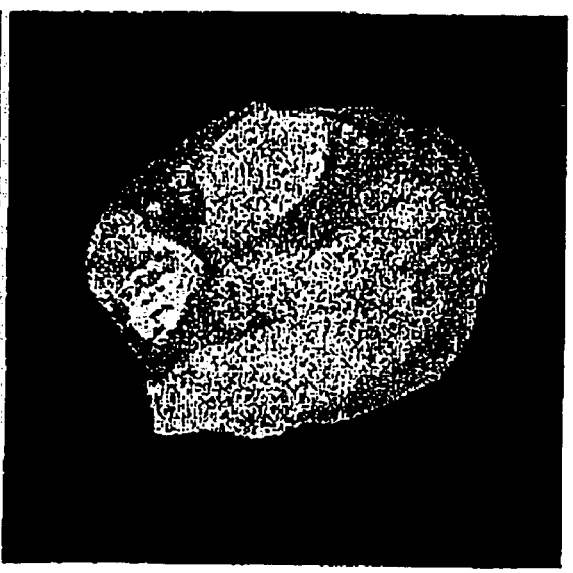
FIG. 7 shows a segmented image of a heart after processing in accordance with the present invention.

FIGS. 6 and 7 show volumetric data taken from medical imaging scans of the hearts of one patient. FIG. 6 is an image in which the heart has been segmented from the surrounding data. FIG. 7 shows an image wherein the heart image of FIG. 6 has been processed in accordance with aspects of the present invention.

The following references are hereby incorporated herein by reference: [1] Yuri Boykov and Marie-Pierre Jolly. Interactive organ segmentation using graph cuts. In *MICCAI*, pages 276-286, October 2000. (See also U.S. patent publication: US20020048401(A1)); [2] Yuri Boykov, Olga Veksler, and Ramin Zabih. Fast approximate energy minimization via graph cuts. In *ICCV*, pages 377-384, 1999; [3] Ting Chen, Dimitri Metaxas, and Leon Axel. 3d cardiac anatomy reconstruction using high resolution ct data. In *MICCAI*, pages 41-1-418, 2004; [4] Charles Florin, Romain Moreau-Gobard, and Jim Williams. Automatic heart peripheral vessels segmentation based on a normal mip ray casting technique. In *MICCAI*, pages 483-490, 2004. [5] Alejandro F. Frangi, Wiro J. Niessen, and Max A. Viergever. Three-dimensional modeling for functional analysis of cardiac images: a review. *IEEE Trans. on Medical Imaging*, 20(1):2-25, January 2001; [6] Alejandro F. Frangi, Daniel Rueckert, Julia Schnabel, and Wiro J. Niessen. Automatic construction of multiple-object three-dimensional statistical shape models: application to cardiac modeling. *IEEE Trans. on Medical Imaging*, 21(9): 1151-1166, September 2002; [7] Juha Koikkalainen, Mika Pollari, Jyrki Lotjonen, Sari Kivisto, and Kirsi Lauerma. Segmentation of cardiac structures simultaneously from short- and long-axis mr images. In *MCCAI*, pages 427-434, 2004; [8] Steven C. Mitchell, Johan G. Bosch, Johan H. C. Reiber Boudewijn P. F; Lelieveldt, Rob J. van der Geest, and Milan Sonka. 3-d active appearance models: segmentation of cardiac MR and ultrasound images. *IEEE Trans. on Medical Imaging*, 21(9):1167-1178, September 2002; [9] M. Sermesant, C. Forest, X. Pennec, H. Delingette, and N. Ayache. Deformable biomechanical models: application to 4d cardiac image analysis. *Medical Image Analysis*, 7(4):475-488, December 2003; [10] Marcin Wierzbicki, Maria Drangova, Gerard Guiraudon, and Terry Peters. Mapping template heart models to patient data using image registration. In *MCCAI*, pages 671-478, 2004.

While there have been shown, described and pointed out fundamental novel features of the invention as applied to preferred embodiments thereof, it will be understood that various omissions and substitutions and changes in the form and details of the device illustrated, and in its method of operation, may be made by those skilled in the art without departing from the spirit of the invention. It is the intention, therefore, to be limited only as indicated by the scope of the claims appended hereto.

We claim:

1. A method for segmenting a heart within a set of volumetric data by a processor, comprising:
   processing the set of volumetric data to determine a minimum value of an energy function including a blob energy term that provides a segmentation with a bias towards a convex shape; and,
   segmenting the surface of the heart based on the processing of the set of volumetric data by the processor.

2. The method as claimed in claim 1, wherein the blob energy term can be expressed as $$E_{blob}(f) = \sum_{p,q \in neighbors} B_{p,q}(f(p), f(q); C),$$

wherein $B_{p,q}$ is a cost associated with an angle between line segments pq and pC where C is a center of a seed region and p and q are nodes in a graph.

3. The method as claimed in claim 1, wherein the energy function is expressed as $E(f)=E_{smooth}(f)+E_{data}(f)+E_{blob}(f)$ and the first term $E_{smooth}(f)$ measures how much a pair of neighboring pixels look alike in the set of data and the second term $E_{data}(f)$ measures how much a value at a pixel matches an expected appearance of an object.

4. The method as claimed in claim 3, wherein the term $E_{blob}(f)$ favors edges that are orthogonal in any radial direction.

5. The method as claimed in claim 2, wherein $E_{blob}(f)$ can be expressed as:

$$E_{blob}(f) = \sum_{p,q \in neighbors} B_{p,q}(f(p), f(q); C) \text{ wherein}$$

$$B_{p,q}(f(p), f(q), C) = \cos^2(pq, pC) * \delta(f(p), f(q))$$

if $\cos(pq, pC) < 0$ and $B_{p,q}(f(p), f(q), C) = 0$ otherwise.

6. The method as claimed in claim 1, further comprising automatically placing seeds inside the heart in the set of volumetric data.

7. A computer system for segmenting a heart within volumetric data, the computer system comprising:
   a processor; and
   a memory in communications with the processor, the memory including program code executable by the processor to perform the following steps:
   processing the set of volumetric data to determine a minimum value of an energy function including a blob energy term that provides a segmentation with a bias towards a convex shape; and,
   segmenting a surface of the heart based on the processing of the set of volumetric data.

8. The system as claimed in claim 7, wherein the blob energy term can be expressed as $$E_{blob}(f) = \sum_{p,q \in neighbors} B_{p,q}(f(p), f(q); C),$$

wherein $B_{p,q}$ is a cost associated with an angle between line segments pq and pC where C is a center of a seed region and p and q are nodes in a graph.

9. The system as claimed in claim 7, wherein the energy function is expressed as $E(f)=E_{smooth}(f)+E_{data}(f)+E_{blob}(f)$ and the first term $E_{smooth}(f)$ measures how much a pair of neighboring pixels look alike in the set of data and the second term $E_{data}(f)$ measures how much a value at a pixel matches an expected appearance of an object.

10. The system as claimed in claim 9, wherein the term $E_{blob}(f)$ favors edges that are orthogonal in any radial direction.

11. The system as claimed in claim 8, wherein $E_{blob}(f)$ can be expressed as:

$$E_{blob}(f) = \sum_{p,q \in neighbors} B_{p,q}(f(p), f(q); C) \text{ wherein}$$

$$B_{p,q}(f(p), f(q), C) = \cos^2(pq, pC) * \delta(f(p), f(q))$$

if $\cos(pq, pC) < 0$ and $B_{p,q}(f(p), f(q), C) = 0$ otherwise.

12. The system as claimed in claim 7, further comprising means for automatically placing seeds inside the heart in the set of volumetric data.

13. A method for segmenting with a processor an object within a set of volumetric data, comprising:
   processing by the processor of the set of volumetric data to determine in a graph cuts segmentation a minimum value of an energy function having a first term, a second term and a third term;
   wherein the third term favors edges in a graph that are orthogonal in a radial direction; and,
   segmenting the surface of the object based on the processing of the set of volumetric data.

14. The method as claimed in claim 13, wherein the first term measures how much a pair of neighboring pixels look alike in the set of data and the second term measures how much the value at a pixel resembles the expected appearance of an object.

15. The system as claimed in claim 13, wherein the third term is:

$$E_{blob}(f) = \sum_{p,q \in neighbors} B_{p,q}(f(p), f(q); C) \text{ wherein}$$

$$B_{p,q}(f(p), f(q), C) = \cos^2(pq, pC) * \delta(f(p), f(q))$$

if $\cos(pq, pC) < 0$ and $B_{p,q}(f(p), f(q), C) = 0$ otherwise.

16. The method as claimed in claim 13, wherein the object is a heart.

17. The method as claimed in claim 16, further comprising automatically placing seeds inside the heart in the set of volumetric data.

18. The method as claimed in claim 17, wherein the step of automatically seeding involves expanding a virtual balloon in the heart in the volumetric data until a side of the balloon has contacted the heart.

19. The method as claimed in claim 17, wherein the step of automatically seeding involves determining a volumetric data barycenter weighted by intensity.

20. The method as claimed in claim 6, further comprising:
   determining a volumetric data barycenter weighted by intensity; and
   inflating a virtual balloon in the heart in the volumetric data until a side of the balloon has contacted a wall of the heart.

* * * * *

UNITED STATES PATENT AND TRADEMARK OFFICE
CERTIFICATE OF CORRECTION

PATENT NO. : 7,634,123 B2
APPLICATION NO. : 11/370302
DATED : December 15, 2009
INVENTOR(S) : Florin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 952 days.

Signed and Sealed this

Ninth Day of November, 2010

David J. Kappos
*Director of the United States Patent and Trademark Office*